(12) United States Patent
Barnekow et al.

(10) Patent No.: US 8,524,294 B2
(45) Date of Patent: Sep. 3, 2013

(54) PRESSED AGGLOMERATES SUITABLE FOR CONSUMPTION HAVING RETARDED AROMA RELEASE

(75) Inventors: Rainer Barnekow, Marienmünster (DE); Wolfgang Fexer, Holzminder (DE)

(73) Assignee: Symrise AG, Holzminden (DE)

( * ) Notice: Subject to any disclaimer, the term of this patent is extended or adjusted under 35 U.S.C. 154(b) by 1000 days.

(21) Appl. No.: 12/280,285

(22) PCT Filed: Mar. 3, 2006

(86) PCT No.: PCT/EP2006/060463
§ 371 (c)(1),
(2), (4) Date: Nov. 12, 2008

(87) PCT Pub. No.: WO2007/098809
PCT Pub. Date: Sep. 7, 2007

(65) Prior Publication Data
US 2009/0246315 A1 Oct. 1, 2009

(51) Int. Cl.
A23G 4/18 (2006.01)
A23G 3/20 (2006.01)
A23L 1/30 (2006.01)
A21C 9/06 (2006.01)

(52) U.S. Cl.
USPC .................. 426/5; 426/72; 426/103; 426/297

(58) Field of Classification Search
USPC ............................................ 426/72, 103, 297
See application file for complete search history.

(56) References Cited

U.S. PATENT DOCUMENTS

| | | | |
|---|---|---|---|
| 3,159,585 A | 12/1964 | Evans et al. | |
| 3,583,874 A | 6/1971 | Germino et al. | |
| 3,769,038 A | 10/1973 | Mitchell et al. | |
| 3,971,852 A | 7/1976 | Brenner et al. | |
| 4,207,355 A | 6/1980 | Chiu et al. | |
| 4,228,199 A | 10/1980 | Chiu et al. | |
| 4,391,836 A | 7/1983 | Chiu | |
| 4,465,702 A | 8/1984 | Eastman et al. | |
| 4,532,145 A | 7/1985 | Saleeb et al. | |
| 5,037,929 A | 8/1991 | Rajagopalan et al. | |
| 5,124,162 A | 6/1992 | Boskovic et al. | |
| 5,731,029 A | 3/1998 | Karwowski et al. | |
| 5,932,270 A | 8/1999 | Rock et al. | |
| 6,086,917 A | 7/2000 | Trubiano et al. | |
| 6,391,376 B1 | 5/2002 | Hansen et al. | |
| 2005/0048189 A1 | 3/2005 | Lombard et al. | |
| 2005/0048190 A1 | 3/2005 | Trksak et al. | |
| 2005/0191387 A1 | 9/2005 | Armstrong et al. | |
| 2008/0075806 A1* | 3/2008 | Dorr et al. ................. | 426/64 |

FOREIGN PATENT DOCUMENTS

| | | |
|---|---|---|
| EP | 0667147 | 8/1995 |
| EP | 0922449 | 6/1999 |
| EP | 1072262 | 1/2001 |
| EP | 1177788 | 2/2002 |
| GB | 903506 | 8/1962 |
| WO | WO-9933437 | 7/1999 |
| WO | WO-03066030 | 8/2003 |
| WO | WO-2004049827 | 6/2004 |

* cited by examiner

*Primary Examiner* — Humera Sheikh
*Assistant Examiner* — Bhaskar Mukhopadhyay
(74) *Attorney, Agent, or Firm* — Novak Druce Connolly Bove + Quigg LLP

(57) ABSTRACT

A pressed agglomerate (compacted material) which is suitable for consumption, a process for its preparation, its use for aromatizing products and products comprising such a pressed agglomerate are described.

7 Claims, No Drawings

PRESSED AGGLOMERATES SUITABLE FOR CONSUMPTION HAVING RETARDED AROMA RELEASE

CROSS-REFERENCE TO RELATED APPLICATION

This application claims benefit of priority to PCT/EP2006/060463, which published as WO2007/098809, filed on Mar. 3, 2006, the disclosure of which is incorporated herein by reference in its entirety.

The present invention relates to a pressed agglomerate (compacted material) which is suitable for consumption, a process for its preparation, its use for aromatizing and/or flavoring products and products comprising such a pressed agglomerate.

The aromatization of products which are suitable for consumption has been known for a long time. Either liquid aromas, solid aromas (i.e. aromas applied to solid carriers, e.g. spray-dried aromas, or aromas enclosed in solid carriers) or also dried pieces of plants are conventionally used in this procedure.

It is desirable to produce new types of consumable products, for example based on cold water soluble aromatized products, allowing the consumer to perceive different sensory experiences (in particular gustatory, nasal and optionally optical) sequentially on consumption of said consumable products. It is further desirable to provide consumable products, in particular foodstuffs or beverages, in powdered form.

On the market are powdered soft drink mixes that change color while providing a flavor when mixed with water. Powdered soft drink mixes that change flavor are not available.

Kool-Aid Magic Twists™ from Kraft Foods for example is available as "Changin' Cherry", a green drink powder that turns blue, and has a red cherry flavor; and as "Grape Illusion", a gold powder that changes to red and has a purple grape flavor. The change in color takes place within less than 30 seconds.

An aroma in the context of the present invention comprises at least one aroma substance, but usually two or more different aroma substances. Aromas typically are complex mixtures of volatile components (aroma substances). In particular, aroma substances in the context of the present invention are sensorially active substances having a vapor pressure of at least 0.01 Pa at 25° C., more preferably a vapor pressure of at least 0.025 Pa at 25° C. Aroma substances in large part show a vapor pressure of at least 0.5 Pa at 25° C., therefore such aroma substances in particular are meant by the term volatile component (aroma substance).

When mixed with cold water uncompacted spray-dried aromas (i.e. in powder-form) dissolve rapidly, a very fast uniform release of the aroma substance(s) occurs and retarded release of the aroma substance(s) is not achievable.

Certain pressed agglomerates, mostly prepared by compacting, based on spray-dried aromas are already commercially available. Compacted spray-dried aromas, when mixed with cold water, show a fast release of the aroma substance(s), to a considerable extent depending on the particle size, a retarded release of the aroma substance(s) is not achievable. WO 2004/049827 describes a granulated flavor which releases flavor immediately when needed.

One possibility to alter the release properties and to retard release of aroma substance(s) from compacted spray-dried aromas is to apply a coating to compacted spray-dried aromas, said coating having a barrier function to a certain extent against cold water.

It was therefore the primary object of the present invention to provide particles that allow a controlled, in particular a retarded, release of aroma substance(s) in cold water. In addition, these particles should be as easy as possible to prepare. Moreover these particles should have a high stability, in particular should the particles be mechanically stable and be stable to oxidation.

It was a secondary object of the present invention to provide consumables (consumable products) that afford a retarded release of aroma substance(s) when mixed with cold water, such as cold process and instant (powdered) foodstuffs or beverages. In particular a sequential flavor release is desired during use and consumption of said consumable products when mixed with cold water, in order to allow the consumer to experience two or more different flavor directions (and optionally one or more changes in color) during consumption.

According to a first aspect of the present invention, this object is achieved by a pressed agglomerate which is suitable for consumption, comprising or consisting of:
a) aroma (spray-dried or not),
b) optionally maltodextrin,
c) 1-60 wt. % of one or more cold water swellable starches, and
d) optionally one or more coloring agents which are suitable for consumption,
wherein weight percent values are based on the total weight of the pressed agglomerate.

Herein and in all following descriptions of a pressed agglomerate, weight percent values are based on the total weight of the pressed agglomerate.

According to a second aspect of the present invention, this object is also achieved by a pressed agglomerate which is suitable for consumption and comprises or consists of:
a) aroma (spray-dried or not),
b) maltodextrin (e.g. as a carrier substance, if the aroma is spray-dried),
c) 1-60 wt. % of one or more cold water swellable starches, and
d) optionally one or more coloring agents which are suitable for consumption.

According to a third aspect of the present invention, this object is achieved by a pressed agglomerate which is suitable for consumption and comprises or consists of:
a) 30-95 wt. % spray-dried aroma,
b) optionally maltodextrin,
c) 1-60 wt. % of one or more cold water swellable starches, and
d) optionally one or more coloring agents which are suitable for consumption.

The weight percent value of spray-dried aroma means the weight percent value of the complete spray-dried product including aroma substances, other constituents of the aroma, and carrier substances.

One advantage of pressed agglomerates according to the first, second or third aspect of the present invention is that the flavor of the pressed agglomerates according to the invention can be adjusted in strength (intensity) and profile almost as desired, so that, as required, these can make a significant flavor contribution in a product which is suitable for consumption (consumable) containing them. With the pressed agglomerates according to the invention it is possible to aromatize or flavor a consumable product completely and comprehensively, i.e. without addition of a further, optionally liquid, aroma. The pressed agglomerates according to the invention moreover are easy to prepare (see below).

It has furthermore been found that the pressed agglomerates according to the invention are considerably stable to oxidation. After completion of an oxidative stress test, which simulated a storage time of about 12 months at 20° C., the pressed agglomerates according to the invention showed a small decrease in sensory quality. When tasted at the end of the oxidative stress test, the pressed agglomerates according to the invention the original flavor was still clearly detectable.

A spray-dried aroma in the context of the present invention comprises at least one aroma substance (volatile) and at least one non-volatile carrier substance, which can itself be a flavoring substance, but does not have to be (such as e.g. the preferred maltodextrin). Conventional spray-dried aromas comprise at least a carrier substance, an aroma (which can also be an individual aroma substance) and further substances, such as, for example, an emulsifying substance.

Aroma encapsulation by means of spray drying, as described, for example, in U.S. Pat. No. 3,159,585, U.S. Pat. No. 3,971,852, U.S. Pat. No. 4,532,145 or U.S. Pat. No. 5,124,162, is conventional in this art. Spray-dried aromas are commercially obtainable in many different flavor directions and particle sizes.

The aroma loading of spray-dried aroma (amount of aroma in spray-dried aroma) for use in pressed agglomerates according to the invention can be varied within wide ranges, depending on the requirement and the desired sensory profile. The aroma loading advantageously is in the range of 1 to 70 wt. %, preferably in the range of 5 to 40 wt. %, more preferably in the range of 10 to 30 wt. %, based on the total weight of the spray-dried aroma.

Preferably, the weight percent value of aroma means the total weight percent value of volatile aroma substances.

Individual substances or substance mixtures can be employed as carrier substances for the aroma (as constituent a) of a pressed agglomerate according to the first, but in particular the second or third aspect of the invention). Advantageous carrier substances are carbohydrates and/or carbohydrate polymers (polysaccharides). Carrier substances which may be mentioned are, for example, hydrocolloids, such as starches, degraded starches, chemically or physically modified starches, modified celluloses, gum arabic (acacia gum), ghatti gum, tragacanth, karaya, carrageenan, guar bean flour, carob bean flour, alginates, pectin, inulin or xanthan gum.

The degree of decomposition of starch is measured by the "dextrose equivalent" (DE) index, which can assume the limit values of 0 for the long-chain glucose polymer and 100 for pure glucose.

Preferred carrier substances for the aroma (as constituent a) of a pressed agglomerate according to the first, but in particular the second or third aspect of the invention) are derived from starch and have DE values in the range of 5-45, preferably in the range from 10 to 40. The carrier substances present in a pressed agglomerate according to the present invention preferably has an averaged DE value in the range of 18-38. Particularly preferred carrier substances are dextrins and maltodextrins, dextrins having DE values in the range of 30-38 and maltodextrins having DE values in the range of 18-35 in turn are preferred. The content of maltodextrins is preferably in the range of 30-90 wt. %, preferably in the range of 40-80 wt. %, based on the total weight of the pressed agglomerate.

It is irrelevant here which plant has originally supplied the starch for the preparation of the dextrins and maltodextrins. Maize-based raw materials are suitable and readily available, and in order to ensure a product which is free from genetically modified constituents, for example, raw materials from tapioca, manioc, rice, wheat and potatoes can also be employed.

The term maltodextrin also includes mixtures of various maltodextrins. What maltodextrin, in particular with what DE values, is employed depends, inter alia, on the remaining constituents of the dry mixture to be compacted (see below), from which the pressed agglomerates according to the invention are prepared. If fruit powders are used in particular, as described in more detail below, maltodextrins having comparatively low DE values are recommended, preferably having DE values in the range of 5-20. Since fruit powders contain a noticeable content of low molecular weight sugars, which in part have a hygroscopic action (inter alia mono- and disaccharides) and which can adversely influence the processability of the dry mixture to be compacted, the less hygroscopic maltodextrins having DE values in the range of 5-15 are advantageous here.

The aroma loading (amount of aroma, spray-dried or not) of pressed agglomerates according to the present invention can be varied within wide ranges, depending on the requirement and the desired sensory profile. The aroma loading advantageously is in the range of 0.1 to 40 wt. %, preferably in the range of 0.5 to 30 wt. %, more preferably in the range of 1 to 25 wt. %, based on the total weight of the pressed agglomerate.

Possible aromas are, for example, essential oils, fractions thereof, or individual aroma substances. Examples which may be mentioned are: extracts from natural raw materials, such as essential oils, concretes, absolutes, resins, resinoids, balsams and tinctures, such as aniseed oil; basil oil; bergamot oil; bitter almond oil; camphor oil; lemon oil; eucalyptus oil; geranium oil; grapefruit oil; ginger oil; camomile oil; spearmint oil, caraway oil, lime oil; mandarin oil; clove (blossom) oil, orange oil; peppermint oil; rose oil; rosemary oil; sage oil; yarrow oil; star aniseed oil; thyme oil; vanilla extract; juniper berry oil; wintergreen oil; cinnamon leaf oil; cinnamon bark oil; and fractions thereof and constituents isolated therefrom.

Individual aroma substances which can be a constituent of the aroma are, for example, from the following classes of substances: aliphatic esters (saturated and unsaturated), e.g. ethyl butyrate, allyl caproate; aromatic esters, e.g. benzyl acetate, methyl salicylate; organic aliphatic acids (saturated and unsaturated) e.g. acetic acid, caproic acid; organic aromatic acids; aliphatic alcohols (saturated and unsaturated); cyclic alcohols, e.g. menthol; aromatic alcohols, e.g. benzyl alcohol; aliphatic aldehydes (saturated and unsaturated) e.g. acetaldehyde; aromatic aldehydes, e.g. benzaldehyde; vanillin; ketones, e.g. menthone; cyclic ethers, e.g. 4-hydroxy-5-methylfuranone; aromatic ethers, e.g. p-methoxybenzaldehyde, guaiacol; lactones, e.g. gamma-decalactone; terpenes, e.g. limonene, linalool, terpinene, terpineol, citral.

In particular in the case of the second aspect of the invention, the aromas can also be introduced in the form of fruit juice concentrates, fruit pulps or fruit purees, i.e. in the form of thickened natural fruit products. After spray drying of fruit juice concentrates, fruit pulps or fruit purees, the resulting spray-dried aroma is called fruit powder; these fruit powders can advantageously be employed according to the second aspect and according to the third aspect of the invention.

A procedure can also be followed in which fruit juice concentrate, fruit pulps or fruit puree are employed together with a natural and/or nature-identical aroma in a or as a spray solution for the preparation of a spray-dried aroma to be used according to the invention.

In a preferred embodiment of the present invention, the pressed agglomerate comprises a fruit powder and one or more aroma substances which do not originate from a fruit.

Preferred aromas and flavors (flavor directions) of aromas in the context of the present invention are: fruits (e.g. berries, citrus, pomaceous fruit), vanilla, chocolate, coffee, spices, herbs, nuts, alcoholic beverages and mints.

Particularly preferred aromas are aromas of the flavor directions of pineapple, apple, apricot, banana, pear, blackberry, lemon, strawberry, grapefruit, guava, rose hip, blueberry, raspberry, elderberry, currant (red or black), cherry, kiwi, mandarin, mango, yellow plum, orange, papaya, passion fruit, peach, prune, melon (water melon, sugar melon or honeydew melon), tamarind, grape (red or white), plum, chocolate (white, dark, milk and the like), coffee (plain, cappuccino, espresso, latte macchiato and the like), vanillin, vanilla, cardamom, anise, nutmeg, clove, thyme, camomille, cinnamon, rum, whisk(e)y, amaretto, red wine, cognac, vodka (unflavored or flavored), irish cream, coffee liqour, hazelnut, almond, spearmint, eucalyptus, menthol and peppermint.

Conventional additives and ingredients can also be added to a spray solution for the preparation of a spray-dried aroma, to be employed according to the invention, such as coloring agents, sweeteners, food acids, antioxidants, flavor-influencing substances, such as sodium glutamate, vitamins, minerals etc., so that the spray-dried aromas employed according to the invention can also contain such additives.

Spray-dried aromas which can be used according to the invention preferably have particle sizes in the range of 10 to 500 micrometers, preferably an average particle size (median value) in the range of 30 to 200 micrometers.

Pressed agglomerates according to the invention contain as constituent c) one or more cold water swellable (swelling) starches (CWSs). Cold water swellable starch (CWS) is also known as pre-gelatinized starch, pre-cooked starch, pre-gelled starch, instant starch, swell-starch flour, cold water starch, cold water soluble starch or cold water dispersible starch. Cold water swellable starches are also readily available in granular form (also referred to as GCWS) which may also be employed in the present invention.

The CWSs for use in the present invention, upon hydration at ambient temperature (20° C.), form a gel-like structure which is further characterized by its ability to retain moisture.

CWSs, when dispersed in water with a temperature below the swelling temperature of starch (i.e., dependent on the origin of the starch, below about 50-70° C.), increase the viscosity of the liquid without the need for further heating. One part of pregelatinized starch may absorb up to 15 parts of water and give a viscous liquid or gel. CWSs are used in instant pudding and gravy mixes.

CWSs are well known and available in several qualities from numerous manufacturers, e.g. Advanta-Gel™ from National Starch, Merigel or Mira-Gel® from A.E. Staley/Tate & Lyle, Paselli Easy-Gel™ from Avebe Food, Pure-Gel® or Inscosity® from Grain Processing Corporation, C* HiForm™ from Cerestar/Cargill, or ColdSwell from KMC. Mixtures of cold water swellable starches can of course also be used.

It is not important here which plant has originally supplied the starch for the preparation of the cold water swellable starches. Suitable and readily available CWSs typically are based on maize or corn (e.g. waxy or dent maize) and potato-based (potato or sweet potato); starches from other plants (e.g. wheat, rice, tapioca, mung bean, (waxy) barley or sago) can also be employed. By way of example, the following patents describe cold water swellable starches: U.S. Pat. No. 4,207,355; U.S. Pat. No. 4,228,199, U.S. Pat. No. 4,391,836; U.S. Pat. No. 4,465,702; U.S. Pat. No. 5,037,929; US 2005/0048190 A1.

According to the first aspect, the second aspect and the third aspect of the present invention, the content of cold water swellable starches is in the range of 1-60 wt. %, preferably in the range of 2-40 wt. %, more preferably in the range of 5-25 wt. %, based on the total weight of the pressed agglomerate.

According to the present invention (all aspects), CWSs having a cold water solubility of at least 50 wt. % are preferred. CWSs having a cold water solubility of 70 wt. % or higher are preferred, most preferably is a cold water solubility of 75 wt. % or higher (measured according to U.S. Pat. No. 4,465,702 at a water temperature of 20° C. at 1013 mbar). Cold water solubility as used in characterizing the CWSs is determined by mixing a known weight of starch in a measured volume of distilled water at 20° C. with a blender (e.g. a Waring blender), centrifuging the starch suspension and weighing the residue obtained by evaporation of a measured aliquot of the supernatant liquid. The water solubility of the starch sample is expressed as % water solubles, dry substance basis. A specific procedure for measuring cold water solubility of starch samples is described in U.S. Pat. No. 4,465,702 at col. 11 line 49 to col. 12 line 20. This procedure is herein incorporated by reference.

According to the present invention, the CWSs preferably have a fat content of less than 0.5 wt. %, more preferably of less than 0.25 wt. %.

Numerous applications and products of CWSs are known, such as in instant puddings (U.S. Pat. No. 3,583,874), meat-based jerky products (U.S. Pat. No. 5,731,029), meat-based strip-shaped molded products (US 2005/0048189), cold process bake fruit pastes (U.S. Pat. No. 5,932,270, U.S. Pat. No. 6,391,376) or frozen baked goods (US 2005/0191387).

The pressed agglomerates according to the present invention (first aspect, second aspect and third aspect) are preferably free of (processed) meat (i.e. free of ground beef, emulsified chicken meat and the like).

The pressed agglomerates according to the present invention show the desired retarded aroma release: when stirred in cold water the aroma (and optionally further present ingredients such as coloring agent(s)) typically is released within the range of 30 seconds to 8 minutes, preferably in the range of 60 seconds to 5 minutes, strongly depending on the amount of CWS incorporated into the pressed agglomerates of the present invention. The given ranges refer to the period of time until complete dissolution of the pressed agglomerates according to the present invention in water (20° C.) occurs, measured with stirring at about 300 rpm. The higher the amount of CWS, the slower the release of aroma (and optionally further present ingredients). It is not necessary to apply a coating to the pressed agglomerates according to the present invention to obtain a retarded aroma release. Preferably, the pressed agglomerates according to the present invention are coating-free.

A preferred pressed agglomerate is one which comprises or consists of:
a) 0.1-40 wt. % aroma (spray-dried or not),
b) 30-90 wt. % maltodextrin,
c) 1-60 wt. % of one or more cold water swellable starches, and
d) optionally one or more water soluble coloring agents which are suitable for consumption,
wherein weight percent values are based on the total weight of the pressed agglomerate.

A particularly preferred pressed agglomerate which is suitable for consumption is one which comprises or consists of:
a) 0.5-30 wt. % aroma (spray-dried or not),
b) 40-80 wt. % maltodextrin,
c) 2-40 wt. % of one or more cold water swellable starches, and d) one or more water soluble coloring agents which are suitable for consumption, wherein weight percent values are based on the total weight of the pressed agglomerate.

A most preferred pressed agglomerate which is suitable for consumption is one which comprises or consists of:
a) 1-25 wt. % aroma (spray-dried or not),
b) 40-80 wt. % maltodextrin,
c) 5-25 wt. % of one or more cold water swellable starches, and
d) one or more water soluble coloring agents which are suitable for consumption, wherein weight percent values are based on the total weight of the pressed agglomerate.

Further preferred embodiments and aspects of the present invention are described below, in the examples and in the claims.

Pressed agglomerates according to the invention preferably have an average particle size in the range of 0.3 (300 µm) to 5 mm, more preferably in the range of 0.5 (500 µm) to 2 mm.

Pressed agglomerates according to the invention preferably are in the form of broken granules. For the preparation of broken granules, see below.

On consumption in a product suitable for consumption, pressed agglomerates according to the invention impart a strong flavor impression, the intensity of the flavor impression and the flavor profile being adjustable via the dosage and the composition of the (optionally spray-dried) aroma (constituent a)).

The pressed agglomerates according to the invention preferably have a water content in the range of 0.1 to 8 wt. %, preferably in the range of 0.3 to 6 wt. %, based on the total weight of the pressed agglomerate.

The pressed agglomerates according to the invention can contain one or more constituents from the group consisting of: preservatives, antioxidants, emulsifiers, diluents, foam preventers, sugars, sugar substitutes, sugar alcohols, sweeteners, dyestuffs, coloring agents, pigments, flavor-intensifying agents, nutraceuticals, trace elements, minerals, vitamins, acids suitable for consumption, and plant extracts.

The pressed agglomerates according to the invention can contain, for example, the following preservatives: sodium chloride, sucrose, nitrites, in particular Na, K and Ca nitrite, and sulfites, in particular Na, K and Ca sulfite. Organic acids or salts thereof can moreover be employed, in particular sorbic acid, benzoic acid, formic acid and the Na, K and Ca salts of these acids, as well as 4-hydroxybenzoic acid esters, salicylic acid and dehydracetic acid.

Pressed agglomerates according to the invention can contain one or more acids suitable for consumption, which are preferably solid (at 25° C.). Preferably the (solid) acids are present in an amount in the range of 0.1-10 wt. %, particularly preferably in the range of 0.5-5 wt. %, based on the total weight of the pressed agglomerate. The content of acid substantially depends on the desired flavor direction and the flavor profile sought. Preferred acids are citric acid, adipic acid, malic acid, fumaric acid, ascorbic acid (vitamin C), succinic acid and tartaric acid, in particular citric acid, ascorbic acid and malic acid.

The pressed agglomerates according to the invention can contain, for example, the following flavor-intensifying agents: maltol, furaneol to improve the sweet flavour, as well as sodium L-glutamate (MSG, glutamic acid), inosine 5'-monophosphate (IMP), 5-guanosine monophosphate (GMP), hydrolysed vegetable proteins (HVP) and yeast extracts.

Antioxidants, or substances which can intensify an antioxidative action, which are suitable as a constituent of the pressed agglomerates according to the invention are the naturally occurring tocopherols and derivatives thereof, tocotrienols, flavonoids, ascorbic acid and its salts, alpha-hydroxy acids (e.g. citric acid, lactic acid, malic acid, tartaric acid) and Na, K and Ca salts thereof, constituents, extracts and fractions thereof isolated from plants, e.g. from tea, green tea, algae, grape seeds, wheat germ, rosemary and oregano; flavonoids, quercetin and phenolic benzylamines. Propyl gallate, octyl gallate, dodecyl gallate, butylhydroxyanisole (BHA), butylhydroxytoluene (BHT), lecithins, mono- and diglycerides of edible fatty acids esterified with citric acid, orthophosphates and Na, K and Ca salts of monophosphoric acid and ascorbyl palmitate are furthermore suitable as antioxidants.

Emulsifiers which can be a constituent of the pressed agglomerates according to the invention are, for example, lecithins, Na, K, Al, Mg and Ca salts of edible fatty acids, hydroxylated lecithin, mono- and diglycerides of edible fatty acids esterified with acetic acid, lactic acid, citric acid or monoacetyl- and diacetyltartaric acid, succinylated monoglycerides, ammonium phosphatides, monosodium phosphate derivatives of mono- and diglycerides of edible fats or oils, or fatty acids which form edible fat, ethoxylated mono- and diglycerides, sugar esters (esters of sucrose and edible fatty acids), polyglycerol polyricinoleate, propylene glycol esters of edible fatty acids, lactyl esters of edible fatty acids, sodium stearoyllactyl 2-lactate, calcium stearoyllactyl 2-lactate, stearyl tartrate, sorbitan monostearate, sorbitan tristearate, sorbitan monolaurate, sorbitan monooleate, sorbitan monopalmitate, polysorbate 20, polysorbate 40, polysorbate 60, polysorbate 65, polysorbate 80, stearyl monoglyceridyl citrate, succistearin, copolymer condensates of ethylene oxide and propylene oxide, dioctyl sodium sulfosuccinate, sodium lauryl sulfate, sodium stearyl fumarate and lactylated fatty acid esters of glycerol and 1,2-propylene glycol.

As typical sugars which can be a constituent of the pressed agglomerates according to the invention there may be mentioned glucose syrups, glucose-fructose syrups, isomerose syrups, isoglucose syrups, invert sugar syrups and crystalline sugars, such as sucrose, glucose, lactose, hydrolysed lactose, sorbose, arabinose, xylose, mannose, maltose, galactose, maltotriose or fructose.

Suitable sugar substitutes which can be a constituent of the pressed agglomerates according to the invention are sugar alcohols, such as, for example, mannitol, sorbitol and sorbitol syrup, isomalt (e.g. Palatinit®), maltitol and maltitol syrup, lactitol, xylitol, erythritol, leucrose, arabinol, arabitol, adonitol, alditol, dulcitol and iditol, and also fructo-oligosaccharides (e.g. Raftilose®), oligofructose or polydextrose.

As typical sweeteners which can be a constituent of the pressed agglomerates according to the invention there may be mentioned saccharin (optionally as the Na, K or Ca salt), aspartame (e.g. NutraSweet®), cyclamate (optionally as the Na or Ca salt), acesulfame K (e.g. Sunett®), thaumatin or neohesperidin dihydrochalcone. It is of course also possible to use other sweeteners, such as stepvioside, rebaudioside A, glycyrrhizin, ultrasweet, osladin, brazzein, miraculin, pentadin, phyllodulcin, dihydrochalcones, arylureas, trisubstituted guanidines, glycyrrhizin, superaspartame, suosan, sucralose (trichlorogalactosucrose, TGS), alitame, monellin or Neotame®.

The pressed agglomerates according to the invention can contain, for example, the following dyestuffs, coloring agents or pigments: lactoflavin (riboflavin), beta-carotene, riboflavin 5'-phosphate, alpha-carotene, gamma-carotene, caramel, cantaxanthin, erythrosine, curcumin, quinoline yellow, Yellow Orange S, tartrazine, bixin, norbixin (annatto, orlean), capsanthin, capsorubin, lycopene, beta-apo-8'-carotenal, beta-apo-8'-carotenic acid ethyl ester, xanthophylls (flavoxanthin, lutein, cryptoxanthin, rubixanthin, violaxanthin and rodoxanthin), fast carmine (carmic acid, cochineal), azorubine (carmoisine), Cochineal Red A (Ponceau 4 R), beetroot red, betanin, anthocyans, amaranth, Patent Blue V, Indigotine I (indigo carmine), chlorophylls, copper compounds of the chlorophylls, Brilliant Acid Green BS (lissamine green), Brilliant Black BN, carbo medicinalis vegetabilis, titanium dioxide, iron oxides and hydroxides, calcium carbonate, aluminium, silver, gold, Rubine Pigment BK (Lithol Rubine BK), Methyl Violet B, Victoria Blue R, Victoria Blue B, Acilan Brilliant Blue FFR (Brilliant Wool Blue FFR), Naphthol Green B, Acilan Fast Green 10 G (Alkali Fast Green 10 G), Ceres Yellow GRN, Sudan Blue II, ultramarine, phthalocyanine blue, phthalocyanine green and Fast Acid Violet R. Further naturally obtained extracts (e.g. paprika extract, black carrot extract, red cabbage extract) can be used for coloring purposes.

Preferred are water-soluble food coloring agents, preferably chosen from the group consisting of:

Tartrazine (E 102), Sunset Yellow (E 110), Carmoisine (E 122), Ponceau 4R (E 124), Amaranth (E 123), Allura Red (E 129), Brilliant Blue FCF (E 133), Indigo Carmine (E 132), Erythrosine (E 127), Black PN (E 151), Chocolate Brown HT (E155), Patent Blue V (E 131), Quinoline Yellow (E 104) and Green S (E 142);

FD&C Water Soluble Dyes: FD&C Blue No. 2, FD&C Blue No. 1, FD&C Green No. 3, FD&C Red No. 3, FD&C Red No. 40, FD&C Yellow No. 6, FD&C Yellow No. 5, FD&C Red No. 4;

D&C Water Soluble: D&C Green 5, D&C Green 6, D&C Green 8, D&C Orange 4, D&C Red 17, D&C Red 28, D&C Red 33, D&C Red 34, D&C Red 36, D&C Red 6, D&C Red 7, D&C Red 8, D&C Yellow 10, D&C Yellow 11, D&C Yellow 8.

The constituents (as listed above) for the preparation of a pressed agglomerate according to the invention are conventionally mixed and homogenized to form a dry mixture before carrying out a pressing agglomeration (compaction). Conventional mixers, advantageously fluidizing mixers, e.g. plough share mixers (exemplary manufacturer: Lödige), can be employed for the preparation of the dry mixture to be compacted.

The process of pressing agglomeration is understood as meaning a dry agglomeration in which as a rule a dry bulk material of smaller particles is compressed by pressing tools to form larger particles, the pressed agglomerate. In this procedure, in contrast to wet agglomeration, no material bridges are formed and there is no addition of binders. External forces are exerted on the particles by the pressing tools, so that many contacts with small contact distances are established, as a result of which interactions effect the cohesion in the pressed agglomerate at the molecular level, in particular van der Waals forces.

The pressing agglomeration can be carried out by compression or by extrusion, compression being preferred.

In the case of extrusion, ram, strand or perforated die extrusion, for example, can be employed.

According to the invention, the pressing agglomeration is preferably carried out by means of compression with roll pressure machines or presses. In this procedure, the compression is usually carried out either by a ram and template or by rollers with smooth or profiled surfaces running in opposite directions. In addition, embodiments such as a roller press with a perforated template or a toothed wheel perforated press are advantageous.

Roller pressing with a roller compactor with smooth rollers or forming rollers (e.g. tablet-making or briquette-making) is particularly preferred. During roller pressing with smooth rollers, which is in turn advantageous here, a flake is first formed, which is then reduced, i.e. granulated, to the desired granule size, optionally after pre-crushing. This may occur in a single-stage or multi-stage granulation process. The thickness of the flake depends on the distance of the rollers, and the thickness of the flake is typically in the range of 0.1 to 3 mm. In the case of tablet-making or briquette-making, the dry mixture to be compacted can be pressed to relatively large tablets or briquettes in a first step, which are then broken down by means of granulation in a second step.

The granules formed in the granulation (fragmentation) of the flake, briquette or tablet are called broken granules. As a rule, the broken granules are sieved in a further working step, and an upper and lower particle size can be established via the mesh width of the sieves. The fine fraction thereby obtained can be recycled into the compression, and the larger particles separated off by means of sieving can be introduced into the fragmentation again.

The broken granules preferably have an average particle size, in particular after sieving, in the range of 0.3 mm (300 µm) to 5 mm, more preferably from 0.5 mm (500 µm) to 2 mm.

According to the invention, the compression pressure during the roller pressing is usually in the range of 50 to 250 bar, preferably in the range of 70 to 150 bar. At higher pressures, in particular above 100 bar, and depending on the carrier substance/maltodextrin used, an increasing proportion of the pressed agglomerates according to the invention become glassy, i.e. exhibit a glass transition temperature (maltodextrins with higher DE values form a glass more easily).

Roller compactors are commercially obtainable, for example from the companies Hosokawa Bepex GmbH (Germany) or Gerteis Maschinen-und Processengineering (Switzerland).

The present invention furthermore provides a product, in particular a product which is suitable for consumption, comprising a pressed agglomerate, preferably a multiplicity of pressed agglomerates according to the invention, or a mixture of different pressed agglomerates, each of the different pressed agglomerates being an agglomerate according to the invention (in each case preferably in one of the preferred embodiments).

A product which is suitable for consumption is a product which is intended to be introduced into the human oral cavity, to remain there for a certain time and then either be swallowed, i.e. consumed (e.g. foodstuff, beverage) or removed from the oral cavity again (e.g. chewing gums). This also includes substances or products which are intended to be taken in by humans in the processed, partly processed or non-processed state. This furthermore includes all substances which are added to the foodstuff during its preparation, processing or working.

Preferred products according to the invention which are suitable for consumption are, for example, powder products (powdered beverage drink mixes, such as soft drink mixes, instant desserts in powder form, such as pudding powders), baked goods (biscuits, cakes, muffins, waffles, baking mixtures), confectionery (hard caramels, soft caramels, compressed products), dairy products (yogurts, puddings, ice-creams), chocolate goods (white, milk or plain chocolate, chocolate bars), fat compositions (fillings for baked goods, such as e.g. biscuit fillings, fatty fillings for chocolate, fatty fillings for bars), chewing gums and sweets for chewing (sugar-free, sugar-containing), cereals (rolled oats, cornflakes), muesli mixtures (conventional bulk muesli, students' mix, muesli bars, snacks and snack mixtures (sweet popcorn, mixture of fruit pieces, nuts, nut bars, fruit-and-nut bars) and sprinkling mixtures (toppings).

Depending on the product type, the content of pressed agglomerates according to the invention in a product according to the invention (which is suitable for consumption) is usually in the range of 0.1-30 wt. %, based on the total weight of the product.

Preferred products are powder products, dairy products, sweets for chewing and chewing gums. Products in which the pressed agglomerates according to the invention show outstanding visual and sensory properties are powder products.

In powder products, the content of pressed agglomerates according to the invention is generally in the range of 0.1 to 25 wt. %, typically in the range of 0.2 to 10 wt. %, preferably in the range of 0.5 to 5 wt. %, based on the total weight of the product.

Preferred powder products are powdered (instant) beverage drink mixes (beverage powder products) for preparing soft drinks, ice-tea, iced coffee (frappé, e.g. type cappuccino, mocha, vanilla, caramel, hazelnut, cinnamon, butterfinger), cold chocolate drinks or milk-shakes.

Preferred products according to the present invention comprise at least one further aroma, preferably in spray-dried form, wherein the at least one further aroma is not a constituent of a pressed agglomerate.

In a particular preferred embodiment a powdered beverage mixture (beverage powder product) according to the present invention is one which comprises or consists of:

(i) 0.2-10 wt. %, preferably 0.5-5 wt. % of pressed agglomerates or a mixture of different pressed agglomerates according to the present invention, the or each pressed agglomerate comprising an aroma and further preferably a, preferably water-soluble, coloring agent suitable for consumption,
(ii) 30-98 wt. %, preferably 70-96 wt. %, of one or more mono- or disaccharides,
(iii) 0.01-5 wt. %, preferably 0.1-2.5 wt. %, of a further aroma, (preferably in spray-dried form, preferably differing from the aroma used in the pressed agglomerates or aromas used in the mixture of pressed agglomerates as part of constituent (i)), wherein the further aroma is not a constituent of a pressed agglomerate, and
optionally one or more constituents selected from the following groups (iv), (v) and (vi):
(iv) one or more solid acids suitable for consumption and/or salts thereof, preferably in an amount in the range of 0.5-15 wt. %, more preferably in the range of 2-10 wt. %,
(v) one or more high-intensity sweeteners (as illustrated below), preferably in the range of 0.1-1.5 wt. %,
(vi) a further, preferably water-soluble, coloring agent suitable for consumption, preferably differing from the coloring agent, if present, used in the pressed agglomerates as part of constituent (i), wherein the further coloring agent is not a constituent of a pressed agglomerate,
wherein weight percent values are based on the total weight of the powdered beverage mixture.

Preferably, component (i) comprises a coloring agent suitable for consumption and component (iii) is a further aroma in spray-dried form.

In a further particular preferred embodiment a powdered beverage mixture (beverage powder product) according to the present invention is one which comprises or consists of:

(i) 0.2-10 wt. %, preferably 0.5-5 wt. % of pressed agglomerates or a mixture of different pressed agglomerates according to the present invention, the or each pressed agglomerate comprising an aroma (preferably spray-dried) and further preferably a, preferably water-soluble, coloring agent suitable for consumption
(ii) optionally one or more mono- or disaccharides,
(iii) 0.1-20 wt. %, preferably 1-10 wt. %, of a further aroma, preferably in spray-dried form, preferably differing from the aroma used in the pressed agglomerates or aromas used in the mixture of pressed agglomerates as part of constituent (i), wherein the further aroma is not a constituent of a pressed agglomerate, and
(iv) one or more acids suitable for consumption and/or salts thereof, preferably in an amount in the range of 5-60 wt. %, more preferably in the range of 15-40 wt. %,
(v) 0.1-10 wt. %, preferably 0.3-6 wt. % of one or more high-intensity sweeteners,
(vi) optionally a further, preferably water-soluble, coloring agent suitable for consumption, preferably differing from the coloring agent, if present, used in the pressed agglomerates as part of constituent (i), wherein the further coloring agent is not a constituent of a pressed agglomerate,
wherein weight percent values are based on the total weight of the powdered beverage mixture.

Preferably, component (i) comprises a coloring agent and component (iii) is a further aroma in spray-dried form.

Preferred mono- or disaccharides as part of constituent (ii) are glucose, fructose and saccharose (sucrose).

Particularly preferred is a beverage powder product comprising or consisting of:
(i) 1-2.5 wt. % of pressed agglomerates or a mixture of different pressed agglomerates, the or each pressed agglomerate comprising an aroma and a coloring agent,
(ii) 0-95 wt. % of sucrose,
(iii) 0.4-12 wt. % of a spray-dried aroma which is not a constituent of a pressed agglomerate, the aroma in the spray-dried aroma differing from the aroma used in the pressed agglomerates of constituent (i), the spray-dried aroma further comprising a further coloring agent differing from the coloring agent(s) used in the pressed agglomerates of constituent (i),
(iv) 0-35 wt. %, preferably 0.5-35 wt. % of one or more solid acids suitable for consumption and/or salts thereof,
(v) 0-4 wt. %, preferably 0.1-1 wt. %, of one or more high-intensity sweeteners,
(vi) 0-0.5 wt. %, preferably 0.1-0.5 wt. %, of a clouding agent,
(vii) 0-0.5 wt. %, preferably 0.01-0.5 wt. %, of one or more thickening agents,
(viii) 0-50 wt. %, preferably 1-50 wt %, maltodextrin, in addition to any maltodextrin, if present, which is part of any of constituents (i) and (iii),
wherein weight percent values are based on the total weight of the powdered beverage mixture.

Preferred acids suitable for consumption as part of constituent (iv) are solid (at 25° C.). Preferred acids are citric acid, adipic acid, malic acid, fumaric acid, ascorbic acid (vitamin C), succinic acid and tartaric acid, in particular citric acid, ascorbic acid and malic acid.

Preferred high-intensity sweeteners as part of constituent (v) are aspartame, sweeteners, such as, for example, sucralose, xylitol, mannitol, sorbitol, stepvioside, aspartame, alitame, K- or Na-acesulfame, K- or Na-saccharine, Na-cyclamate, thaumatin, neohesperidin dihydrochalcone, or mixtures thereof. Particularly preferred are sucralose, aspartame, K- or Na-acesulfame, K- or Na-saccharine, Na-cyclamate, thaumatin, neohesperidin dihydrochalcone, or mixtures thereof.

A further aspect of the present invention is a process in which a beverage is produced by dissolving a beverage powder product of the present invention, as described above, in water or an aqueous mixture.

Preferably, the pressed agglomerates according to the present invention are used (as such or as part of a consumable product, preferably a powder product) in particular for mixing with a fluid having a water content of at least 80 wt. %, preferably of at least 90 wt. %, said fluid having a temperature in the range of 1-35° C., preferably in the range of 5-22° C.

Preferably, the pressed agglomerates according to the present invention (as such or as part of a consumable product, preferably a powder product) are used for mixing with water or milk (whole milk, semi-skimmed milk or skimmed milk) to obtain a ready-to-use consumable.

A further advantage of the pressed agglomerates according to the invention is the outstanding process accessibility in the preparation of ready-to-consume products containing pressed agglomerates according to the invention. This includes, inter alia, the fact that the density of the pressed agglomerates according to the invention can be varied. In general, density and geometric shape of the pressed agglomerates according to the invention may be varied, as a result of which, for example, floating or demixing (for example in a powder product or muesli mixtures) of the pressed agglomerates according to the invention does not take place.

The invention is explained further with the aid of the following examples, but not limited thereto. Unless stated otherwise, the data relate to the weight.

EXAMPLE 1

Spray-Dried Aromas

The spray-dried aromas produced in Examples 1a-1c had a water content of below 5 wt. %.

EXAMPLE 1a

A spray-dried black currant aroma was prepared via a pressure nozzle using the following spray formulation:

| Ingredients | Parts by weight |
| --- | --- |
| black currant aroma | 100 |
| maltodextrin from potatoes, DE 18-20 | 763 |
| dextrin from manioc, DE 35 | 140 |
| dextrose | 125 |
| carmoisine (E 122), coloring agent | 3.20 |
| water | 1450 |

The resulting spray-dried black currant aroma had the following particle size distribution: D (v 0.1): 39 micrometers, D (v 0.5): 81 micrometers, D (v 0.9): 162 micrometers.

EXAMPLE 1b

A spray-dried lemon & lime aroma was prepared via a pressure nozzle using the following spray formulation:

| Ingredients | Parts by weight |
| --- | --- |
| lemon & lime aroma (incl. lemon oil) | 200 |
| maltodextrin from wheat, DE 20 | 460 |
| dextrose | 125 |
| gum arabic (E 414) | 285 |
| ascorbyl palmitate (E 304) | 0.30 |
| Green S (E 142), coloring agent | 3.50 |
| water | 1300 |

The resulting spray-dried lemon & lime aroma had the following particle size distribution: D (v 0.1): 56 micrometers, D (v 0.5): 112 micrometers, D (v 0.9): 215 micrometers.

EXAMPLE 1c

A spray-dried blood orange aroma was prepared via a pressure nozzle using the following spray formulation:

| Ingredients | Parts by weight |
| --- | --- |
| blood orange aroma (incl. antioxidant BHT, E 321) | 78 |
| acetaldehyde (25% in water) | 25 |
| maltodextrin from wheat, DE 18-20 | 841 |
| dextrose | 120 |
| Starch sodium octenyl succinate (from tapioca) (E 1450) | 70 |
| gum arabic (E 414) | 285 |
| ascorbyl palmitate (E 304) | 0.20 |
| tartrazine (E 102), coloring agent | 14.4 |
| water | 1350 |

The resulting spray-dried blood orange aroma had the following particle size distribution: D (v 0.1): 48 micrometers, D (v 0.5): 96 micrometers, D (v 0.9): 181 micrometers.

EXAMPLE 1d

A spray-dried peppermint aroma was prepared via a pressure nozzle according to Example 1b, the lemon & lime aroma was replaced by 200 parts peppermint oil (*mentha arvensis*) based peppermint flavor, the coloring agent Green S was replaced by an equal amount of Brilliant Blue FCF (E 133).

The resulting spray-dried peppermint aroma had the following particle size distribution: D (v 0.1): 58 micrometers, D (v 0.5): 118 micrometers, D (v 0.9): 241 micrometers.

EXAMPLE 1e

A spray-dried coffee-cappuccino aroma was prepared via a pressure nozzle according to Example 1a, the black currant aroma was replaced by 100 parts coffee-cappuccino flavor, the coloring agent carmoisine was replaced by an equal amount of Black PN (E 151).

The resulting spray-dried coffee-cappuccino aroma had the following particle size distribution: D (v 0.1): 46 micrometers, D (v 0.5): 128 micrometers, D (v 0.9): 271 micrometers.

EXAMPLE 1f

A spray-dried brown rum aroma was prepared via a pressure nozzle according to Example 1a, the black currant aroma was replaced by 100 parts brown rum flavor, the coloring agent carmoisine was replaced by an equal amount of Chocolate Brown HT (E 155).

The resulting spray-dried brown rum aroma had the following particle size distribution: D (v 0.1): 48 micrometers, D (v 0.5): 98 micrometers, D (v 0.9): 188 micrometers.

Spray-dried aromas of other flavor directions can be prepared analogously.

EXAMPLE 2

Fruit Powders

EXAMPLE 2a 100 g of a strawberry fruit powder which had an average particle size of 150 micrometers were obtained, after spray drying, from a spray solution comprising 550 g strawberry puree, 59 g maltodextrin (10 DE, from potatoes) and 3 g citric acid.

EXAMPLE 2b

An apple fruit powder which had an average particle size of 192 micrometers was obtained by spray drying a spray solution comprising 200 parts apple concentrate, 3 parts FD&C Blue No. 1, 390 parts maltodextrin (DE 18-20 from wheat), 200 parts acacia gum kosher, 375 parts glucose syrup (DE 43, from wheat) and 1122 parts water.

EXAMPLE 3

Preparation of the Pressed Agglomerates

EXAMPLE 3a

A dry mixture comprising the ingredients of the following table was pressed in a roller compactor with smooth rollers (Hosokawa Bepex GmbH) under a compression pressure of 80 bar to form a flake, which was then granulated, and the granules were sieved twice (mesh width: 0.5 mm and 1.5 mm). The pressed agglomerates according to the invention having a black currant flavor which were obtained in this way thus had a particle size in the range of 0.5-1.5 mm.

| Ingredients | Wt. % | |
|---|---|---|
| spray-dried aroma, black currant type from Example 1a | 80 | of which about 8.5% black currant aroma, 74% maltodextrin (18-20 DE), 2% water |
| Advanta-Gel P75 (National Starch) | 20 | CWS |

The resulting pressed agglomerates according to the invention were completely dissolved after about 3 minutes in water at 20° C. and stirring at 300 rpm.

EXAMPLE 3b

A dry mixture comprising the ingredients of the following table was pressed in a roller compactor with smooth rollers (Hosokawa Bepex GmbH) under a compression pressure of 120 bar to form a flake, which was then granulated, and the granules were sieved twice (mesh width: 0.7 mm and 1.25 mm). The pressed agglomerates according to the invention having a lemon & lime flavor which were obtained in this way thus had a particle size in the range of 0.7-1.25 mm.

| Ingredients | Wt. % | |
|---|---|---|
| spray-dried aroma, lemon & lime type from Example 1b | 80 | of which about 17% lemon & lime aroma, 45% maltodextrin (18-20 DE), 3% water |
| Advanta-Gel P75 (National Starch) | 10 | CWS |
| maltodextrin (18-20 DE) | 10 | |

The resulting pressed agglomerates according to the invention were completely dissolved after about 2.5 minutes in water at 20° C. and stirring at 300 rpm.

EXAMPLE 3c

A dry mixture comprising the ingredients of the following table was pressed in a roller compactor with smooth rollers (Hosokawa Bepex GmbH) under a compression pressure of 140 bar to form a flake, which was then granulated, and the granules were sieved twice (mesh width: 1 mm and 1.5 mm). The pressed agglomerates according to the invention having a blood orange flavor which were obtained in this way thus had a particle size in the range of 1-1.5 mm.

| Ingredients | Wt. % | |
|---|---|---|
| spray-dried aroma, blood orange type from Example 1c | 65 | of which about 7% blood orange aroma, 3% maltodextrin (18-20 DE), 2% water |
| Paselli Easy-Gel (Avebe Foods) | 35 | CWS |

The resulting pressed agglomerates according to the invention were completely dissolved after about 5 minutes in water at 20° C. and stirring at 300 rpm.

EXAMPLE 3d

A dry mixture comprising the ingredients of the following table was pressed in a roller compactor with smooth rollers (Hosokawa Bepex GmbH) under a compression pressure of 95 bar to form a flake, which was then granulated, and the granules were sieved twice (mesh width: 0.7 mm and 1.5 mm). The pressed agglomerates according to the invention having a black currant (as well as a slight strawberry) flavor which were obtained in this way thus had a particle size in the range of 0.7-1.5 mm.

| Ingredients | Wt. % | |
|---|---|---|
| spray-dried aroma, black currant type from Example 1a | 60 | of which about 8.5% black currant aroma, 74% maltodextrin (18-20 DE), 2% water |
| Advanta-Gel P75 (National Starch) | 15 | CWS |
| strawberry fruit powder (spray-dried) according to Example 2a | 23 | maltodextrin (10 DE), aroma, water |
| citric acid | 2 | solid acid |

The resulting pressed agglomerates according to the invention were completely dissolved after about 2.5 minutes in water at 20° C. and stirring at 300 rpm.

EXAMPLE 3e

The procedure was analogous to Example 3a, using the apple fruit powder according to Example 2b instead of the spray-dried black currant aroma from Example 1a. The pressed agglomerates according to the invention having an apple flavor which were obtained in this way had a particle size in the range of 0.5-1.5 mm.

EXAMPLE 3f

A dry mixture comprising the ingredients of the following table was pressed in a roller compactor with smooth rollers (Hosokawa Bepex GmbH) under a compression pressure of 85 bar to form a flake, which was then granulated, and the granules were sieved twice (mesh width: 0.7 mm and 1.5 mm). The pressed agglomerates according to the invention having a peppermint and black currant flavor which were obtained in this way thus had a particle size in the range of 0.7-1.5 mm.

| Ingredients | Wt. % | |
|---|---|---|
| spray-dried aroma, peppermint type from Example 1d | 45 | of which about 18% peppermint aroma, 45% maltodextrin (18-20 DE), 2% water |
| spray-dried aroma, black currant type from Example 1a | 40 | of which about 8.5% black currant aroma, 74% maltodextrin (18-20 DE), 2% water |
| Advanta-Gel P75 (National Starch) | 15 | CWS |

EXAMPLE 3g

A dry mixture comprising the ingredients of the following table was pressed in a roller compactor with smooth rollers (Hosokawa Bepex GmbH) under a compression pressure of 100 bar to form a flake, which was then granulated, and the granules were sieved twice (mesh width: 0.7 mm and 1.5 mm). The pressed agglomerates according to the invention having a coffee-cappuccino and brown rum flavor which were obtained in this way thus had a particle size in the range of 0.7-1.5 mm.

| Ingredients | Wt. % | |
|---|---|---|
| spray-dried aroma, coffee-cappuccino type from Example 1e | 52 | of which about 8.5% coffee-cappuccino aroma, 75% maltodextrin (18-20 DE), 2% water |
| spray-dried aroma, brown rum type from Example 1f | 30 | of which about 8.0% brown rum aroma, 74% maltodextrin (18-20 DE), 2% water |
| Paselli Easy-Gel (Avebe Foods) | 12 | CWS |

EXAMPLE 4

Instant Beverage Mix

A dry mixture comprising the ingredients of the following table was prepared:

| | |
|---|---|
| sugar (sucrose) | 93.504% |
| citric acid | 4.0% |
| trisodium citrate | 0.26% |
| tricalcium phosphate | 0.22% |
| ascorbic acid (vitamin C) | 0.24% |
| clouding agent and titanium dioxide (E 171) | 0.20% |
| xanthan gum (E 415) | 0.072% |
| sodium carboxy methyl cellulose (E 467) | 0.064% |
| pectin (E 440) | 0.04% |
| spray-dried pineapple flavor, including yellow colorant tartrazine | 0.40% |

125 g of this dry mixture was stirred (at about 300 rpm, stirring being maintained) into 1000 mL water (temperature 18° C.). The resulting beverage then had a yellow color and a pineapple taste. The main part of the pressed agglomerates according to the present invention at this stage were undissolved. After about 3 min. the pressed agglomerates according to the present invention had completely dissolved. The finally obtained beverage had a purple color and a black currant flavor.

EXAMPLE 5

Sugar-Reduced Instant Beverage Mix

A dry mixture comprising the ingredients of the following table was prepared:

| | |
|---|---|
| sugar (sucrose) | 82.169% |
| citric acid | 11.58% |
| trisodium citrate | 0.70% |
| tricalcium phosphate | 0.60% |
| ascorbic acid (vitamin C) | 0.66% |
| Grindsted JU 543 stabilizer system | 0.90% |
| Na-saccharin | 0.561% |
| spray-dried orange flavor, including yellow colorant tartrazine | 1.33% |
| pressed agglomerates from Example 3e | 1.50% |

45 g of this dry mixture was stirred (at about 300 rpm, stirring being maintained) into 1000 mL water (temperature 18° C.). The resulting beverage then had a yellow color and an orange taste. The main part of the pressed agglomerates according to the present invention at this stage were undissolved. After about 3 min. the pressed agglomerates according to the present invention had completely dissolved. The finally obtained beverage had a green color and an apple flavor.

EXAMPLE 6

Sugar-Free Instant Beverage Mix

A dry mixture comprising the ingredients of the following table was prepared:

| | |
|---|---|
| maltodextrin (powder) | 48.93% |
| citric acid | 33.33% |
| ascorbic acid (vitamin C) | 0.44% |
| aspartame | 3.30% |
| spray-dried raspberry flavor, including red colorant | 11.50% |
| pressed agglomerates from Example 3c | 2.50% |

8 g of this dry mixture is stirred (at about 300 rpm, stirring being maintained) into 1000 mL water (temperature 18° C.). The resulting beverage then had a red color and a raspberry taste. The main part of the pressed agglomerates according to the present invention at this stage were undissolved. After about 5 min. the pressed agglomerates according to the present invention had completely dissolved. The finally obtained beverage had an orangered color and a blood orange flavor.

EXAMPLE 7

Iced Coffee Powder Mix (Frappé)

200 g of a commercially available powder mix having the following ingredients:
sugar, skimmed milk powder 39.6%, coffee-extract 5.6%, maltodextrin, vegetable oil, flavor, thickener (E 412), stabilizer (E 339), anti-caking agent (E 341) were mixed with 6 g of the coffee-cappuccino and brown rum flavored pressed agglomerates according to the invention of Example 3g.

25 g of the resulting mixture were stirred into 200 ml of water or semi-skimmed milk (1.5% fat) having a temperature of about 10° C. The prepared iced coffee drink was sipped in time intervals of 30 seconds, and briefly stirred after each sip.

In comparison to the commercially available powder mix a brown rum flavor and a stronger coffee-cappuccino was observed, in particular starting after about 60-90 seconds from preparation of the iced coffee drink.

EXAMPLE 8

Chewing Gum with Pressed Agglomerates According to the Invention

The following gum formula was formed into chewing gum pellets, comprising black currant and peppermint flavored pressed agglomerates according to the invention:

| | |
|---|---|
| sorbitol | 40.0% |
| gum base | 32.0% |
| calcium carbonate | 15.0% |
| glycerin | 1.5% |
| mannitol | 4.5% |
| sorbitol liquid | 3.0% |
| liquid peppermint flavor | 0.5% |
| encapsulated menthol | 1.0% |
| encapsulated aspartame | 0.5% |
| pressed agglomerates from Example 3d | 1.0% |

The resulting chewing gum pellets were subsequently panned with a mixture of 68% xylitol and isomalt, 2% of an aqueous solution of a mixture of FD&C Blue No. 1 and D&C Red No. 33, and 30% water. The resulting chewing gum pellets had sugar-free coating and had a purple color.

On consumption of the coated chewing gum pellets, a strong menthol/peppermint and black currant flavor is perceived, which develops and becomes stronger during chewing and which is released over a prolonged period of time during chewing.

EXAMPLE 9

Ambrosia with Pressed Agglomerates According to the Invention

List of Ingredients:

| | | |
|---|---|---|
| sugar | sucrose | 80.0% |
| stabilizer | Hamulsion GGF Hahn & Co., Lübeck | 12.0% |
| citric acid | ground | 3.0% |
| trisodium citrate | gelling aid | 2.0% |
| green coloring | | 0.05% |
| pressed agglomerates from Example 3b | | 2.95% |

Preparation instructions: Stir 41 g of this mixture into 250 ml of water (ambient temperature or lukewarm) and then cool to 5-10° C.

SPECIFIC EMBODIMENTS

Specific embodiment one comprises a pressed agglomerate which is suitable for consumption, comprising or consisting of:
a) aroma (spray-dried or not),
b) optionally maltodextrin,
c) 1-60 wt. % of one or more cold water swellable starches, and
d) optionally one or more coloring agents which are suitable for consumption,
wherein weight percent values are based on the total weight of the pressed agglomerate.

Specific embodiment two comprises a pressed agglomerate according to specific embodiment one, comprising or consisting of:
a) aroma (spray-dried or not),
b) maltodextrin,
c) 1-60 wt. % of one or more cold water swellable starches, and
d) optionally one or more coloring agents which are suitable for consumption,
wherein weight percent values are based on the total weight of the pressed agglomerate.

Specific embodiment three comprises a pressed agglomerate according to any of specific embodiments one or two, comprising:
a) 30-95 wt. % spray-dried aroma,
wherein weight percent values are based on the total weight of the pressed agglomerate.

Specific embodiment four comprises a pressed agglomerate according to any of specific embodiments one or two, comprising or consisting of:
a) 0.1-40 wt. % aroma (spray-dried or not),
b) 30-90 wt. % maltodextrin, c) 1-60 wt. % of one or more cold water swellable starches, and d) optionally one or more coloring agents which are suitable for consumption, wherein weight percent values are based on the total weight of the pressed agglomerate.

Specific embodiment five comprises aressed agglomerate according to specific embodiment four, comprising or consisting of:

a) 0.5-30 wt. % aroma (spray-dried or not), b) 40-80 wt. % maltodextrin, c) 2-40 wt. % of one or more cold water swellable starches, and d) one or more coloring agents which are suitable for consumption, wherein weight percent values are based on the total weight of the pressed agglomerate.

Specific embodiment six comprises a pressed agglomerate according to any of specific embodiments four or five, comprising or consisting of:

a) 1-25 wt. % aroma (spray-dried or not), b) 40-80 wt. % maltodextrin, c) 5-25 wt. % of one or more cold water swellable starches, and d) one or more coloring agents which are suitable for consumption, wherein weight percent values are based on the total weight of the pressed agglomerate.

Specific embodiment seven comprises a pressed agglomerate according to any of specific embodiments one to six, which is free of (processed) meat.

Specific embodiment eight comprises a pressed agglomerate according to any of specific embodiments one to seven, wherein the pressed agglomerate is in the form of broken granules.

Specific embodiment nine comprises a pressed agglomerate according to any of specific embodiments one to eight, wherein the water content of the pressed agglomerate is in the range of 0.1 to 5 wt. %, based on the total weight of the pressed agglomerate.

Specific embodiment ten comprises a pressed agglomerate according to any of the preceding specific embodiments, characterized in that it contains one or more constituents from the group consisting of: preservatives, antioxidants, emulsifiers, diluents, foam preventers, sugars, sugar substitutes, sugar alcohols, sweeteners, dyestuffs, coloring agents, pigments, flavor-intensifying agents, nutraceuticals, trace elements, minerals, vitamins, acids suitable for consumption, and plant extracts.

Specific embodiment eleven comprises a process for the preparation of a pressed agglomerate according to any of specific embodiments one to ten, with the following step: compression, favorably roller pressing, of the constituents to form the pressed agglomerate.

Specific embodiment twelve comprises a product, preferably suitable for consumption, comprising (i) a pressed agglomerate according to any of specific embodiments one to ten, or (ii) a mixture of different pressed agglomerates, each of the different pressed agglomerates being an agglomerate according to any of specific embodiments one to ten.

Specific embodiment thirteen comprises a product according to specific embodiment twelve, wherein the product is a powder product, a dairy product, a sweet for chewing or a chewing gum.

Specific embodiment fourteen comprises a product according to any of specific embodiments twelve or thirteen, wherein the product is a beverage powder product.

Specific embodiment fifteen comprises a product according to any of specific embodiments twelve to fourteen, which comprises at least one further aroma, preferably in spray-dried form, wherein the at least one further aroma is not a constituent of a pressed agglomerate.

Specific embodiment sixteen comprises a beverage powder product according to any of specific embodiments fourteen or fifteen, comprising or consisting of:

(i) 0.2-10 wt. % of pressed agglomerates or a mixture of different pressed agglomerates, the or each pressed agglomerate comprising an aroma, (ii) 30-98 wt. % of one or more mono- or disaccharides, and (iii) 0.01-5 wt. % of a further aroma (spray-dried or not), wherein the further aroma is not a constituent of a pressed agglomerate, wherein weight percent values are based on the total weight of the powdered beverage mixture.

Specific embodiment seventeen comprises a beverage powder product according to any of specific embodiments fourteen or fifteen, comprising or consisting of:

(i) 0.2-10 wt. % of pressed agglomerates or a mixture of different pressed agglomerates, the or each pressed agglomerate comprising an aroma, (iii) 0.1-20 wt. % of a further aroma (spray-dried or not), wherein the further aroma is not a constituent of a pressed agglomerate, (iv) one or more acids suitable for consumption and/or salts thereof, and (v) 0.1-10 wt. % of one or more high-intensity sweeteners, wherein weight percent values are based on the total weight of the powdered beverage mixture.

Specific embodiment eighteen comprises a beverage powder product according to any of specific embodiments fourteen or fifteen, comprising or consisting of:

(i) 1-2.5 wt. % of pressed agglomerates or a mixture of different pressed agglomerates, the or each pressed agglomerate comprising an aroma and a coloring agent, (ii) 0-95 wt. % of sucrose, (iii) 0.4-12 wt. % of a spray-dried aroma which is not a constituent of a pressed agglomerate, the aroma in the spray-dried aroma differing from the aroma used in the pressed agglomerates of constituent (i), the spray-dried aroma further comprising a further coloring agent differing from the coloring agent(s) used in the pressed agglomerates of constituent (i), (iv) 0-35 wt. %, preferably 0.5-35 wt. % of one or more solid acids suitable for consumption and/or salts thereof, (v) 0-4 wt. %, preferably 0.1-1 wt. %, of one or more high-intensity sweeteners, (vi) 0-0.5 wt. %, preferably 0.1-0.5 wt. %, of a clouding agent, (vii) 0-0.5 wt. %, preferably 0.01-0.5 wt. %, of one or more thickening agents, (viii) 0-50 wt. %, preferably 1-50 wt %, maltodextrin, in addition to any maltodextrin, if present, which is part of any of constituents (i) and (iii), wherein weight percent values are based on the total weight of the powdered beverage mixture.

Specific embodiment nineteen comprises a process of producing a beverage by dissolving a product according to any of specific embodiments sixteen to eighteen in water or an aqueous mixture.

Specific embodiment twenty comprises use of a pressed agglomerate according to any of specific embodiments one to ten or a mixture of different pressed agglomerates, each of the different pressed agglomerates being an agglomerate according to any of specific embodiments one to ten, for aromatizing or flavoring a product, in particular a product which is suitable for consumption.

It is claimed:

1. A pressed agglomerate, comprising:

a) 1-25 wt. % aroma;

b) 40-80 wt. % maltodextrin;

c) 5-25 wt. % of one or more cold water swellable starches; and d) one or more coloring agents suitable for consumption, wherein the wt. % value is based on the total weight of the pressed agglomerate, and wherein the pressed agglomerate is completely dissolved and the aroma is released from the pressed agglomerate within 60 seconds to 5 minutes in water at a temperature of 20° C. with stirring at about 300 rpm.

2. A pressed agglomerate according to claim 1, wherein the aroma is spray-dried.

3. The pressed agglomerate according to claim 1, comprising:

a) 30-95 wt. % spray-dried aroma, wherein the wt. % value is based on the total weight of the pressed agglomerate.

4. The pressed agglomerate according to claim 1, wherein the pressed agglomerate is free of meat.

5. The pressed agglomerate according to claim 1, wherein the pressed agglomerate is in the form of broken granules.

6. The pressed agglomerate according to claim 1, wherein the water content of the pressed agglomerate is in the range of 0.1 to 5 wt. %, based on the total weight of the pressed agglomerate.

7. The pressed agglomerate according to claim 1, wherein the agglomerate comprises a constituent selected from the group consisting of: preservatives, antioxidants, emulsifiers, diluents, foam preventers, sugars, sugar substitutes, sugar alcohols, sweeteners, dyestuffs, pigments, flavor-intensifying agents, nutraceuticals, trace elements, minerals, vitamins, acids suitable for consumption, and plant extracts.

* * * * *